(12) United States Patent
Bearey (10) Patent No.: US 7,891,691 B2
(45) Date of Patent: Feb. 22, 2011

(54) TRAILER HITCH ALIGNMENT GUIDE

(76) Inventor: Dale Bearey, 15130 S. River Dr., Miami, FL (US) 33169

( * ) Notice: Subject to any disclaimer, the term of this patent is extended or adjusted under 35 U.S.C. 154(b) by 133 days.

(21) Appl. No.: 12/025,853

(22) Filed: Feb. 5, 2008

(65) Prior Publication Data

US 2009/0194969 A1    Aug. 6, 2009

(51) Int. Cl.
*B60D 1/36* (2006.01)
(52) U.S. Cl. .................. 280/477; 33/364; 116/28 R
(58) Field of Classification Search ............. 280/477; 116/28 R; 33/264
See application file for complete search history.

(56) References Cited

U.S. PATENT DOCUMENTS

| | | | |
|---|---|---|---|
| 3,621,807 A | 11/1971 | Kang | |
| 3,702,029 A * | 11/1972 | Anderson, Jr. | 33/264 |
| 3,820,065 A | 6/1974 | Koplewicz et al. | |
| 4,065,147 A | 12/1977 | Ross | |
| 4,621,432 A * | 11/1986 | Law | 33/264 |
| 5,036,593 A * | 8/1991 | Collier | 33/264 |
| 5,101,927 A | 4/1992 | Murtuza | |
| 5,231,392 A | 7/1993 | Gust | |
| 5,655,474 A | 8/1997 | Pretsch | |
| 5,669,621 A | 9/1997 | Lockwood | |
| 5,680,706 A | 10/1997 | Talcott | |
| 5,894,673 A | 4/1999 | Pretsch | |
| 6,168,181 B1 | 1/2001 | Gadd | |
| 6,273,448 B1 | 8/2001 | Cross | |
| 6,851,697 B2 | 2/2005 | Kinnard | |
| 2005/0218626 A1 | 10/2005 | Kwilinski | |
| 2006/0220345 A1 | 10/2006 | Schmidt | |

* cited by examiner

*Primary Examiner*—Kevin Hurley
(74) *Attorney, Agent, or Firm*—Fleit Gibbons Gutman Bongini & Bianco PL; Gary S. Winer; Paul D. Bianco (57) ABSTRACT

An apparatus for aligning a trailer hitch and receiver includes an elongated channel or tube defining an angle, such that when the trailer is tilted back for hitching, the upper tube is substantially vertically aligned. A rubber tipped rod extends from the lower tube and contacts the vehicle when the vehicle draws near the trailer. As the rod is pushed into the lower tube, a connecting rod drives an actuator or indicating rod upwards. A calibration tube is slid over the upper tube, and is aligned along the upper tube to expose a brightly colored painted region on the indicating rod at the point where the receiver and hitch are aligned one above the other. Alternatively, the calibration tube moves a series of switches up or down, whereby the actuator is pushed by the rod to contact the switches successively to indicate the approach to and arrival at a hitching position, by the illumination of electric lights, and or by activation of an audible signal. The calibration rod may alternatively slide on the lower tube, wherein the contact rod creates or activates electrical connections within the calibration tube. The apparatus may further be incorporated into the trailer frame, before or after manufacturing. One or more of the apparatus may be placed near the rear of the trailer to aid lateral alignment, or to gauge the distance of the trailer to an object behind the trailer, either before or after hitching.

18 Claims, 8 Drawing Sheets

TRAILER HITCH ALIGNMENT GUIDE

FIELD OF THE INVENTION

The present invention relates to a light weight easily deployed indicator for aligning a vehicle and a trailer while the vehicle is backing up, including indication of both lateral and longitudinal alignment.

BACKGROUND OF THE INVENTION

The difficulties in backing a vehicle to engage a trailer hitch are well known. A miscalculation on the part of the driver can result in damage to the vehicle, typically by the trailer coupling body striking the rear of the vehicle, and may also result in damage to the trailer, its contents, or injury to people or objects nearby.

A challenge specifically arises in aligning the ball, pintle or other hitch ("hitch") with the trailer coupling body ("coupler") both laterally and longitudinally. Lateral alignment requires that the coupler is centered side to side with respect to the vehicle. Longitudinal alignment requires that the coupler is the correct distance from the rear of the vehicle.

One device to facilitate alignment is disclosed in U.S. Pat. No. 5,669,621 to Lockwood, wherein one post and flag is disposed proximate the hitch, and another post and flag is disposed proximate the coupler. Using this device, the driver maneuvers the vehicle to bring the flags in proximity. This device, however, requires that the driver properly gauges the lateral and longitudinal alignment between flags, including the rate at which the flags are converging. As a practical matter, this is difficult for many drivers.

U.S. Pat. No. 6,273,448 to Cross, and U.S. Patent Publications 2005/0218626 to Kwilinski, and 2006/0220345 to Schmidt, present alternative means to gauge longitudinal alignment. Specifically, in these references the trailer hitch strikes a panel or a part of the flag post, causing either a visible or audible alarm, or movement of the flag pole, to alert the driver when the hitch is near the coupler. These methods, however, still present a danger of the hitch missing the strike zone of the device, whereby the hitch and coupler pass each other, with attendant consequences as described above. Moreover, in all of these devices, there are no indications until the hitch and coupler are very close, and thus a vehicle backing at speed may simply overshoot the target, as may occur with the device of Lockwood.

U.S. Pat. No. 6,851,697 to Kinnard extends a metal tape in the direction of the vehicle, whereby when the hitch and coupler are a more significant distance apart, an indicator begins to reveal their relative proximity. Kinnard additionally activates if there is lateral misalignment, as there is no longer a necessity of hitting a strike zone near the coupler.

In Kinnard, however, heavy, rigid materials are required, as well as a stout mounting system and bracket body which are bolted to the jack post of a trailer. Trailers without a jack post cannot accommodate the device of Kinnard. Further, there is a requirement that the jackpost be positioned sufficiently close to the forward edge of the trailer, so that the device may contact the vehicle when extended.

Permanently mounted devices, such as disclosed in Kinnard, may not have a need to be buoyant, as they are not likely to fall into the water. However, a device which is quickly and easily removed without tools would greatly benefit from being buoyant, if dropped into water. Kinnard, however, is not adapted to be floatable without the addition of a substantial quantity of buoyant materials.

It would further be advantageous to have a device which offers a soft, dampened contact, as opposed to contact by a rigid metallic tape or the like. In Kinnard, the metal tape is described as usually contacting the license plate, which does not pose as much a problem with respect to scratching or denting as the painted bodywork of a vehicle. As a practical matter, however, contact with the bodywork of the vehicle can be expected, and the device must therefore not pose a potential hazard to the vehicle's finish.

Another advantage would be to have a device which, in addition to other attributes, greatly facilitates visual lateral and longitudinal alignment, is of low cost, that can easily moved from one trailer to another, is quickly and easily calibrated, is sufficiently light and buoyant to float, is easier to see, and presents a minimum of risk of damage to the vehicle or trailer in use.

SUMMARY OF THE INVENTION

In accordance with the invention, a device is provided which assists in maneuvering a tow vehicle towards a towed object, rendering both longitudinal and lateral alignment guidance, whereby the towed coupling is disposed in engaging proximity to the towing hitch.

In one embodiment, a hitch guide includes a main body comprising a lower channel or tube reversibly attached to a trailer draw bar or coupling area, generally longitudinally aligned with the trailer. Connection may be by any of a variety of means, including magnets, brackets, hook and loop fasteners, bolts, or straps.

Magnets are advantageous employed in that trailer construction materials commonly include magnetically active metal, and thus attachment requires only that the main body and attached magnets are placed in proximity to the desired attachment point. Magnets may be disposed along any side of the main body, so that attachment can be made on the side or bottom of the device.

An engagement rod is slideably retained within the main body, and extends towards the vehicle during deployment. The engagement rod is advantageously made of a lightweight material, such as fiberglass, but may be of any suitably rigid material. The end which contacts the vehicle is advantageously constructed of, or coated with, a material which is resilient and is not likely to scratch paint of a vehicle. A fiberglass rod with a rubber tip has been found to work well.

The main body is bent upwards at an angle. Because the trailer coupler is typically raised above the vehicle hitch prior to connection, the trailer frame to which the lower tube is attached is typically tilted backwards. As a result, the upwards bend of the lower tube is oriented substantially vertically during use of the device.

A calibration channel or tube is slideably disposed in connection with and extending upwards from the main body. Together, the calibration tube and the main body form a continuous channel or tube. An actuating or indicator rod is slideably retained within the calibration tube, extending upwardly therefrom.

A flexible connector is connected to both the engagement rod and indicator rod, disposed within the main body and calibration channel. Accordingly, as the engagement rod is pushed or pulled within the main body, a commensurate movement is imparted to the indicator rod, extending from the calibration tube.

Indicator means are provided at the distal end of the indicator rod. In one embodiment, holes are provided in the calibration body, through which a contrasting color on the indicator rod becomes visible when the rod is extended upwardly. In another embodiment, colored bands, or written indicia become visible when the rod is extended upwardly. Alternatively, both indicator means may be used simultaneously.

In use, the device is first calibrated as follows. With the trailer hitched to the vehicle, the device is placed on the trailer draw bar or other rigid structure at the leading end of the trailer. The engagement rod is slid within the main body, so that the indicator rod is in an elevated position. The calibration tube is slid up or down until the visible indicators correspond to a finished or stop position. The calibration tube will maintain its position through frictional engagement with the main body. Tape or other means may be used to further ensure that the calibration tube is not inadvertently moved.

After calibration, an unhitched trailer may be hitched as follows. While maintaining the calibration tube in the same position as determined during calibration, the engagement rod is slid to extend forwards, advantageously to a full extent. Accordingly, the indicator rod descends within the calibration tube and main body.

The vehicle is then backed up towards the trailer at a reasonable speed. Lateral alignment is accomplished by gauging the location of the device with respect to a centerline of the vehicle, assuming the hitch is oriented at the center of the vehicle. Various means of identifying the center of the vehicle may be employed as needed, as described in the prior art, and particularly as described in U.S. Pat. No. 6,851,697 to Kinnard, incorporated by reference herein. Those means include a sticker or other marker on the rear view mirror or rear window. A marker may similarly be placed on the tailgate or other part of the vehicle. Lateral alignment can then be gauged by noting the offset of the device with respect to the marker while observing the rear view mirror, or by turning and viewing the marker and device directly.

When the vehicle is sufficiently close to the trailer, the vehicle will contact the engagement rod, and will begin to push same into the main body. Concurrently, the indicator rod rises from the calibration tube. The driver observes the indicator rod, and when the markings indicate a stop position, the driver stops the vehicle, at which point the hitch and coupler will be laterally and longitudinally aligned. The trailer tongue is then lowered onto the receiver and coupled to complete the connection.

In an alternative embodiment in accordance with the invention, electrical or electronic means cooperative with lights signal the proximity of the vehicle. In this embodiment, the calibration tube slides within the lower portion of the main tube. The calibration tube houses a series of electrical contacts. The engagement rod slides within the calibration tube, extendable towards the vehicle in use. Disposed about the inner, or proximal end of the engagement rod, is at least one electrical contacting surface electrically contactable with the electrical contacts inside the calibration tube, whereby at least one circuit may be formed as the engagement rod slides within the calibration tube.

The electrical circuits correspond to signals operative to illuminate a series of indicator lights which are indicative of the vehicle proximity. In one embodiment, the lights, for example incandescent bulbs or LED's, are disposed about the uppermost portion of the main body. The electrical circuits may form a direct connection between a power source and the lights, or may signal an electronic processor to flash or otherwise control operation of the indicator lights.

Calibration of an electrical embodiment in accordance with the invention is accomplished by coupling the trailer, and maintaining the engagement rod in contact with the vehicle while sliding the calibration tube forwards or backwards until the indicator lights signal that the vehicle is in position.

In a further embodiment in accordance with the invention, a flag mounted to a flexible post indicates correct longitudinal alignment. The flag post is mounted to extend upwardly from an upper disposed calibration tube. A pin extends from the distal end of the post, operative to enter a retaining aperture in the calibration tube. To prepare for deployment, the flag post is bent over until the pin enters the retaining aperture. The bent post applies an angular force to the pin, whereby the pin is reversibly jammed in the retaining aperture. An ejecting ramp is disposed at the upper end of the flexible connector. When deployed, the flexible connector moves the ramp upwardly to drive the pin from the retaining aperture, whereby the flag is raised by the resilience of the flag post.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
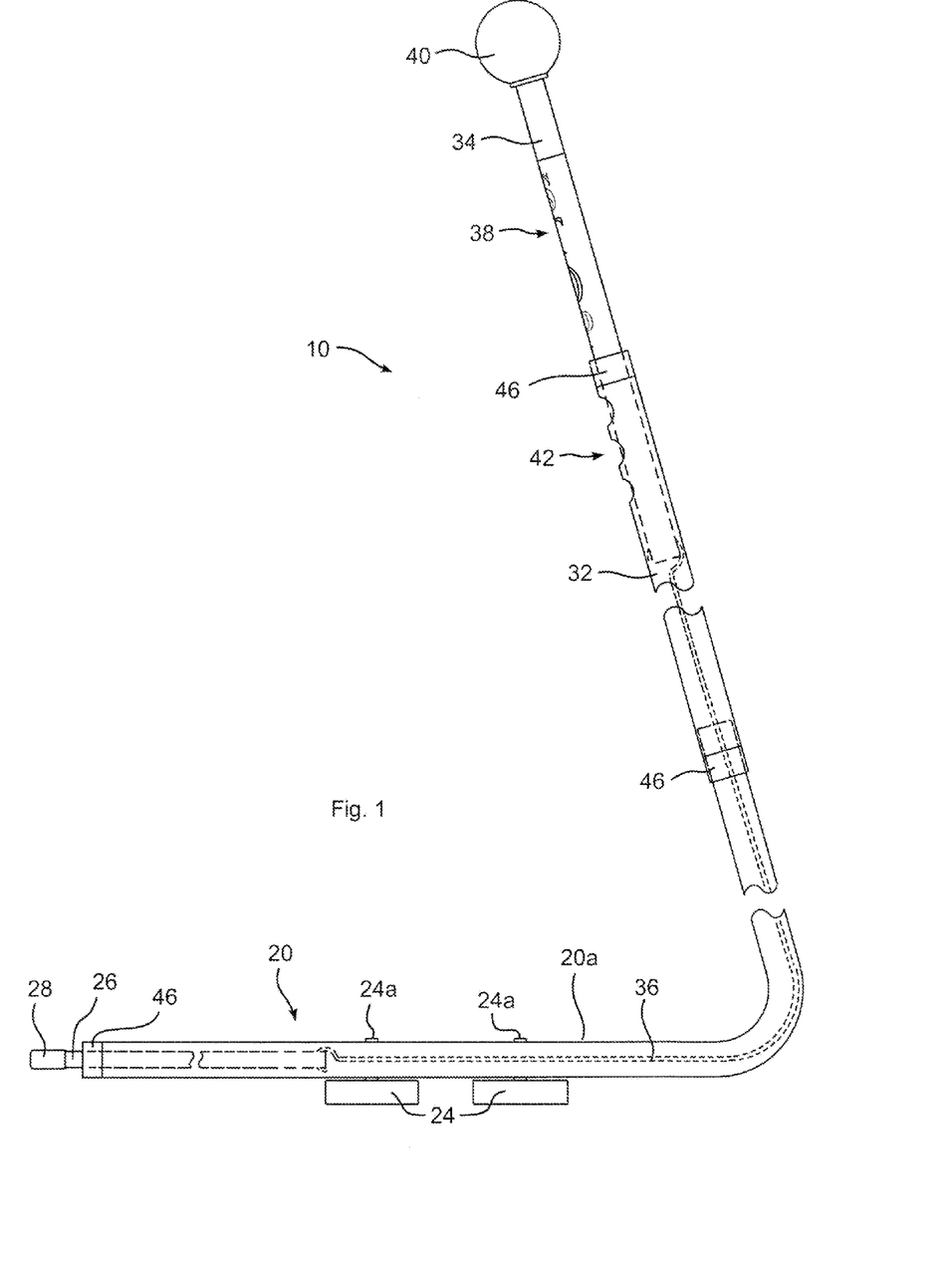
FIG. 1 illustrates a hitch guide in accordance with the present invention.
Figure 2:
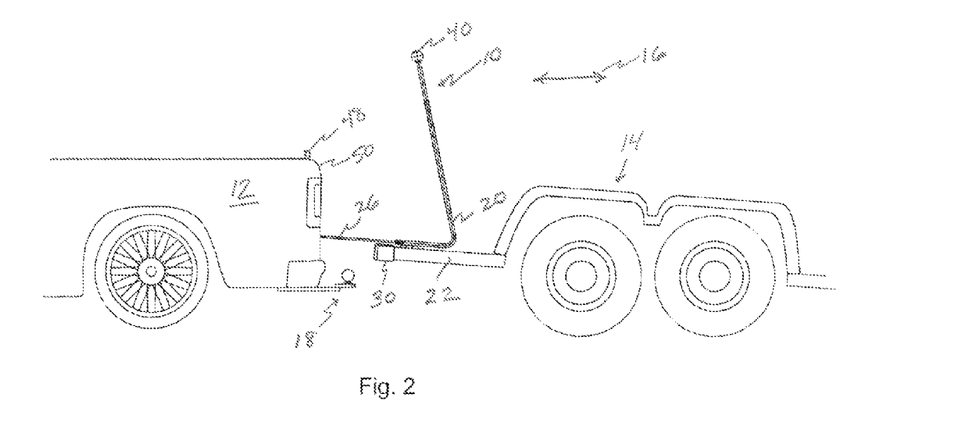
FIG. 2 illustrates the hitch guide of FIG. 1, in use.

Referring now to the figures in which like reference numerals refer to like elements, an exemplary hitch guide 10 in accordance with the invention is illustrated in FIG. 1. With reference to FIG. 2, in accordance with the invention, guide 10 assists in maneuvering a tow vehicle 12 towards a towed object 14, rendering both longitudinal 16 and lateral alignment guidance, whereby the towed coupling is disposed in engaging proximity to a towing hitch 18.

A ball and receiver style hitch is illustrated in FIG. 2, however it should be understood that the invention may be used in combination with other known forms of hitches, where it is important to gauge the relative proximity of hitch portions while moving a towing member towards a towed member.

Referring again to FIG. 1, in one embodiment, a hitch guide 10 includes a main channel or main body 20 comprising a lower channel or tube 20a reversibly attached to a trailer draw bar 22 or coupling area, generally longitudinally aligned with trailer 14. Connection may be by any of a variety of means, including magnets 24, or brackets, hook and loop fasteners, bolts, or straps (not shown). The main body and other channels or tubes may be advantageously fabricated from PVC (polyvinyl chloride), wood, metal, plastic, or other suitably rigid and durable material. PVC is advantageously utilized due to its low cost, easy formability, and buoyancy.

Magnets 24 are advantageous employed in that trailer construction materials commonly include magnetically active metal, and thus attachment requires only that the main body and attached magnets are placed in proximity to the desired attachment point. Due to the light weight construction of a device in accordance with the invention, small, inexpensive magnets suffice for suitable connection strength. Magnets 24 may be disposed along any side of lower tube 20a, so that attachment can be made on the side or bottom of the device. In FIG. 1, magnets 24 are illustrated on the bottom of lower tube 20a, connected by adhesive or mechanical fasteners, such as pins 24a.

A contact extension or engagement rod 26 is slideably retained within main body 20, and extends towards the vehicle 12 during deployment. Engagement rod 26 is advantageously made of a lightweight material, such as fiberglass, but may be of any suitably rigid material. Tip 28, which contacts vehicle 12, is advantageously constructed of, or coated with, a material which is resilient and is not likely to scratch paint of a vehicle. A fiberglass rod with a rubber tip has been found to work well.

Main body 20 is bent upwards at an angle, and defines a first length or first end or lower tube substantially aligned to the longitudinal axis of the trailer when installed, and a second length or second end or upper tube extending upwards with respect to the first end. As can be seen in FIG. 2, because trailer coupler 30 is typically raised above vehicle hitch 18 prior to connection, trailer frame 22 to which main body 20 is attached is typically tilted backwards. As a result, the upwards bend of the upper tube is oriented substantially vertically during use of the device 10.

In one embodiment, a calibration channel or tube 32 is slideably disposed in connection with and extending upwards from main body 20. Together, calibration tube 32 and main body 20 form a continuous channel or tube. An actuator or indicator rod 34 is slideably retained within calibration tube 32, extending upwardly therefrom.

A flexible connector 36 is connected to both engagement rod 26 and indicator rod 34, connector 36 being disposed within main body 20 and calibration channel 32. Accordingly, as engagement rod 26 is pushed or pulled within main body 20, a commensurate movement is imparted to indicator rod 34, extending upwards from calibration tube 32.

Figure 3A:
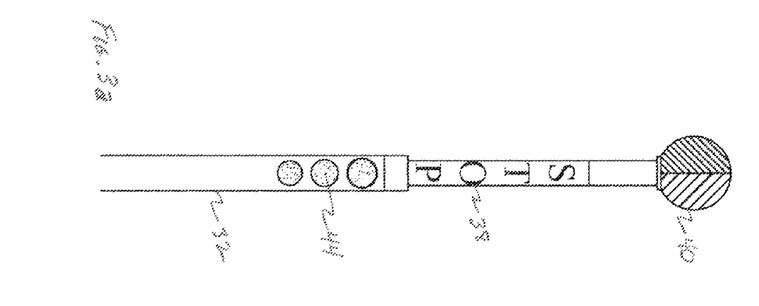
FIG. 3a illustrates an upper portion of the hitch guide of FIG. 1.
Figure 3B:
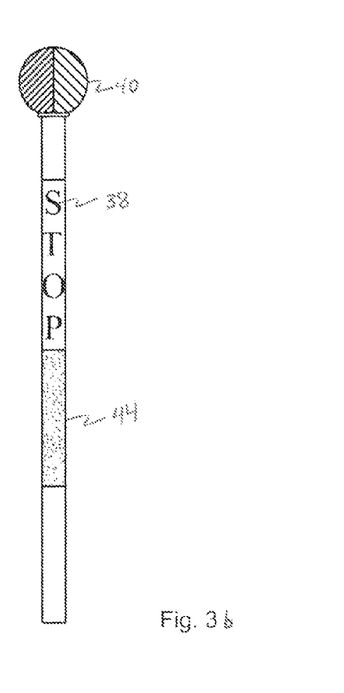
FIG. 3b illustrates an indicator rod of the hitch guide of FIG. 1.

Visible indicator means 38,40,42 are provided at the distal end of the indicator rod. In one embodiment, holes 42 are provided in calibration tube 32, through which a contrasting color 44 (FIG. 3a,3b) on indicator rod 34 becomes visible when rod 34 is extended upwardly. In another embodiment, colored bands (not shown) or written indicia 38 become visible when the rod is extended upwardly. Alternatively, both indicator means 38,44 may be used simultaneously, as shown. Indicator means 40 is visible at all times, and aids in visually locating the device, as well as in lateral alignment, described elsewhere herein. In addition, indicator means 40 may take the form of a buoyant device, to help ensure device 10 does not sink if dropped into water.

In use, device 10 is first calibrated as follows. With trailer 14 hitched to vehicle 12, or at least hitch portions 18,30 longitudinally aligned, device 10 is placed on trailer draw bar 22, or other rigid structure at the leading end of trailer 14. Engagement rod 26 is slid within main body 20, so that indicator rod 34 is in an elevated position. It may be necessary to move device 10 towards or away from vehicle 12 until indicator rod 34 is elevated, and tip 28 contacts vehicle 12. Calibration tube 32 is slid up or down until visible indicators 38,44 correspond to a finished or stop position. Calibration tube 32 will maintain its position through frictional engagement with main body, for example through the use of one or more grommets or collars 46. Tape or other means (not shown) may be used to further ensure that the calibration tube is not inadvertently moved.

After calibration, an unhitched trailer may be hitched as follows. While maintaining calibration tube 32 in the same position as determined during calibration, the engagement rod is slid to extend forwards, advantageously to a full extent. Accordingly, indicator rod 34 descends within calibration tube 32 and main body 20, and a "stop" position is no longer indicated.

Vehicle 12 is then backed up towards trailer 14 at a reasonable speed, decreasing prior to or immediately following contacting tip 28, as evidenced by movement of indicator rod 34. While backing, before contact with tip 28, lateral alignment is accomplished by gauging the location of the device with respect to a centerline of vehicle 12, assuming hitch part 28 is oriented at the lateral center of vehicle 12. Various means of identifying the center of vehicle 12 may be employed as needed, as described in the prior art, and particularly as described in U.S. Pat. No. 6,851,697 to Kinnard, incorporated by reference herein. Those means include a sticker or other marker (not shown) on the rear view mirror or rear window. A marker 48 may similarly be placed in a laterally central location on tailgate 50, or other part of the vehicle. Lateral alignment can then be gauged by noting the offset of device 10 with respect to marker 48, while observing the rear view mirror, or by turning and viewing marker 48 and device 10 directly.

When vehicle 12 is sufficiently close to trailer 14, vehicle 12 will contact engagement rod 26, and will begin to push same into main body 20. Concurrently, indicator rod 34 rises from calibration tube 32. The driver observes indicator rod 34, and when markings 42,38 indicate a stop position, the driver stops vehicle 12, at which point hitch 18 and coupler 30 will be laterally and longitudinally aligned. The coupler 30 is then lowered onto receiver 18 and connected to complete the connection. FIG. 1 illustrates a "stop" condition and indication.

To assemble device 10, flexible connector 36 is fastened to either engagement rod 26 or indicator rod 34, and the assembly is slid within main body 20, coupled to calibration tube 32, as far as possible. Flexible connector 36 is then pulled taught, to expose a length just sufficient for attachment to the remaining unconnected part, either engagement rod 26 or indicator rod 34, such that after engagement, a resilience of flexible connector 36 causes the connected end to be withdrawn within main body 20 or calibration tube 32, and thus the connection is no longer disposed exterior to main body 20. As shown in FIG. 1, flexible connector 36 is attached by being threaded into a hole in each of engagement rod 26 and indicator rod 34. Alternatively, attachment could be by any known means, such as clips, hooks, clamps, threaded connection, adhesives or the like.

Figure 4A:
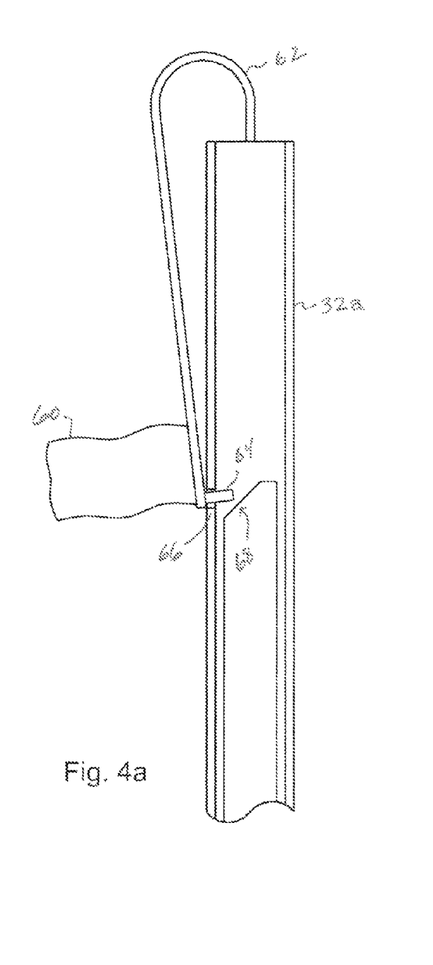
FIG. 4a illustrates an alternative embodiment of an indicator mechanism, in accordance with the invention, with a flag pole retained.
Figure 4B:
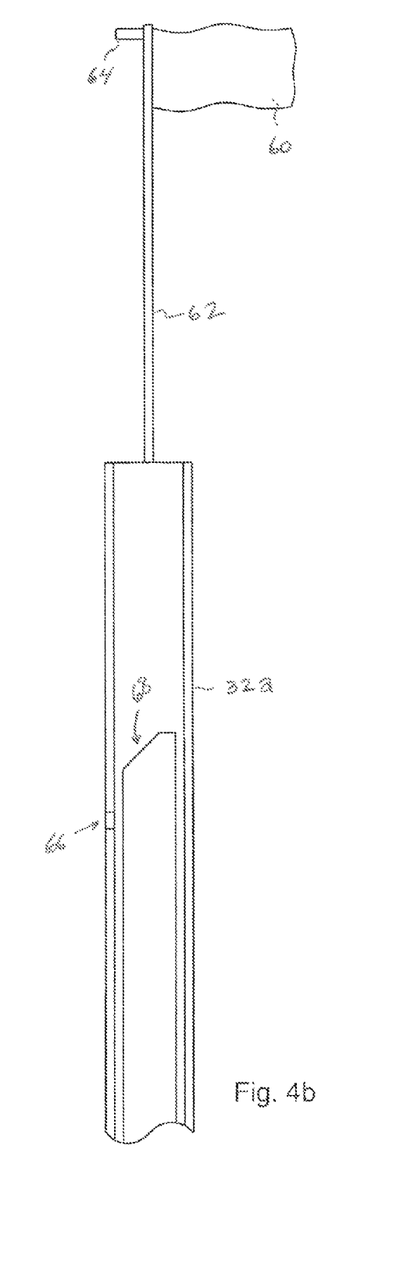
FIG. 4b illustrates the embodiment of FIG. 4a, with a flag pole released.
Figure 5:
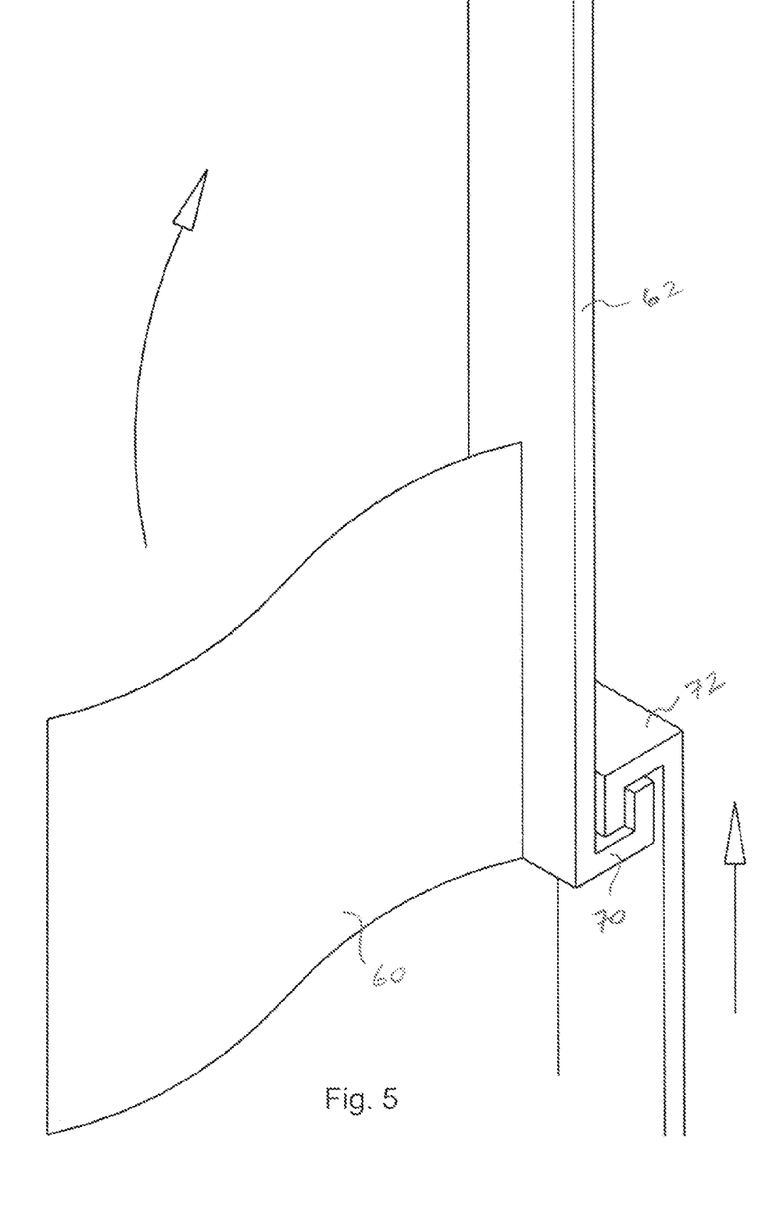
FIG. 5 illustrates an alternative embodiment for retaining the flag pole of FIG. 4.

With reference to FIGS. 4a, 4b and 5, in a further embodiment in accordance with the invention, flag 60 is mounted to resilient flexible flag post 62, to indicate correct longitudinal alignment. Post 62 is mounted to extend upwardly from an upper disposed calibration tube 32a. Catch or pin 64 extends from post 62, in this embodiment from the distal end of post 62, operative to enter retaining aperture 66 in calibration tube 32a. To prepare for deployment, post 62 is bent over until pin 64 enters retaining aperture 66. Because post 62 enters retaining aperture 66 at an angle with respect to the bore of aperture 66, an angular force is applied by pin 64 to aperture 66, whereby pin 64 is reversibly jammed within aperture 66. Ejecting actuator or ramp 68 is disposed at the upper end of flexible connector 36 (not shown in FIG. 4a,4b), and is connected thereto in a secure manner, such as the manner shown with respect to indicator rod 34 shown in FIG. 1. When deployed, flexible connector 36 moves ramp 68 upwardly to drive pin 64 sufficiently out of aperture 66 to overcome the friction imposed by the angular displacement of pin 64, whereby pin 64 is released from retaining aperture 66 through the resilient force applied by post 62, whereupon flag 60 is further raised by the resilience of the post 62 to indicate longitudinal alignment, and a stop position.

Figure 6:
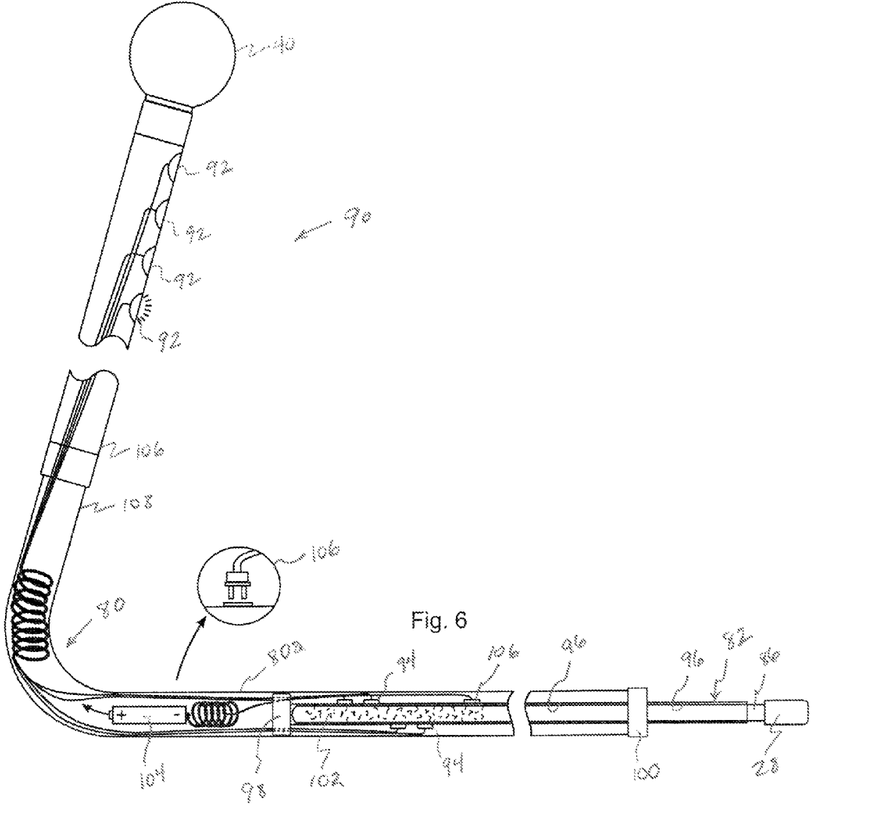
FIG. 6 illustrates an illuminated embodiment in accordance with the invention.

An alternative release mechanism is shown in FIG. 6, wherein catch or pin 64 is replaced by lower mating clasp 70, and ramp 68 is replaced by upper mating clasp 72 lower clasp 70 is connected to post 62, and upper clasp 72 is disposed within calibration tube 32a (not shown in FIG. 5). Lower clasp 70 enters aperture 66 (not shown in FIG. 5), and is engaged with upper clasp 72, by moving engagement rod 26 first inwards to admit passage of lower clasp 70, and then outwards to engage lower clasp 70 with upper clasp 72. As in the embodiment shown in FIGS. 4a,4b, when engagement rod 26 is pushed inwards by contact with vehicle 12, upper clasp 72 is raised, releasing lower clasp 70, wherein post 62 straightens through inherent resiliency, thus raising flag 60.

In an alternative embodiment of a device 90 in accordance with the invention, illustrated in FIG. 6, electrical or electronic means cooperative with lights 92 signal the proximity of vehicle 12. Lights 92 are advantageously LEDs or other bright, energy conserving light source, although incandescent or other light source may be effectively employed. In this embodiment, a calibration tube 82 slides within the lower portion 80a of main tube 80. Calibration tube 82 is supported to slide within main body 80 by standoff 98, which is connected to calibration tube 82 and is disposed about the interiorly disposed end of calibration tube 82, and collar 100, connected to the open end of lower portion 89a. Calibration tube 82 houses a series of electrical contacts 94 which electrically communicate to interior surface 96 if calibration tube 82. Engagement rod 86 slides within calibration tube 82, extendable towards a vehicle in use, as described with respect to device 10 of FIG. 1. Disposed about the inner, or proximal end of engagement rod 86, is at least one electrical conducting surface 102 (illustrated with stippling) electrically contactable with electrical contacts 94 inside calibration tube 82, whereby at least one circuit may be formed as engagement rod 86 slides within calibration tube 82.

A circuit is thus formed from a power supply, represented in FIG. 6 as battery 104 or alternatively an electrical connection 106, either supply disposed about or within device 90 in a manner known in the relevant art. In one embodiment, connection 106 is made to the electrical system of vehicle 12, as by an interposed socket (not shown) associated with the usual hitch electrical connection, in order to supply operating power. The circuit, which may be either positive or negative ground, comprises a loop, for each indicator light 92, from power source 104 or 106, through light 92, to one of contact 94, through conducting surface 102, to grounding conductor 106, and finally back to power source 104 or 106.

With reference to FIG. 6, engagement rod 86 is illustrated fully inserted within calibration tube 82, whereby all lights would be lit, indicating a stop condition. Lights 92 may advantageously be of different colors, to provide additional information to the driver regarding longitudinal proximity. Further, indicator means 40 may also optional be illuminated, either at a stop position, or at all times.

In deployment, device 90 is first calibrated in a manner similar to the manner of device 10 of FIG. 1, in that hitch 18 and coupler 30 are first positioned longitudinally aligned, preferably oriented as they would normally be, just prior to being coupled. In the embodiment of device 90, however, engagement rod 86 is inserted within calibration tube 82 substantially as illustrated, so that all lights are lit. Calibration tube 82 is then slid within lower portion 80a until tip 28 contacts the vehicle. It may be necessary to reposition device 90 so that this may be accomplished. After calibration, calibration tube 82 and engagement rod 86 remain in position by frictional engagement. Calibration tube 82 may optionally be taped or otherwise secured in a calibrated position. The location of either device 10 or device 90 may be indicated on the trailer by tape, paint, or other marking, so that calibration need not be repeated when using the same trailer and vehicle. Prior to the next use of device 90, engagement rod 86 is fully extended, so that as vehicle 12 pushes engagement rod 86 within calibration tube 82, lights 92 will be successively illuminated as each subsequent contact 94 is grounded through ground 106 and conducting surface 102.

With further reference to FIG. 6, in one embodiment in accordance with the invention, upper portion 106 is optionally provided to be slideably retained upon main tube 80, whereby the height of lights 92 and indicator 40 may be adjusted for optimal viewing from vehicle 12. In the absence of portion 106, lights 92 and indicator 40 are mounted upon upper portion 108 of main body 80.

It should be understood that contacts 94 may also take the form of switches, wherein it would not be necessary to ground engagement rod 86. In this embodiment in accordance with the invention, the switch actuator (not shown), such as the roller of a microswitch, extends into the interior of calibration tube 82, and is pushed to activate a switch by passage of engagement rod 86 within calibration tube 82. This may be further understood with reference to FIG. 7, in which calibration tube 32 slides in connection an upper extending portion 108 of main body 20.

Figure 7:
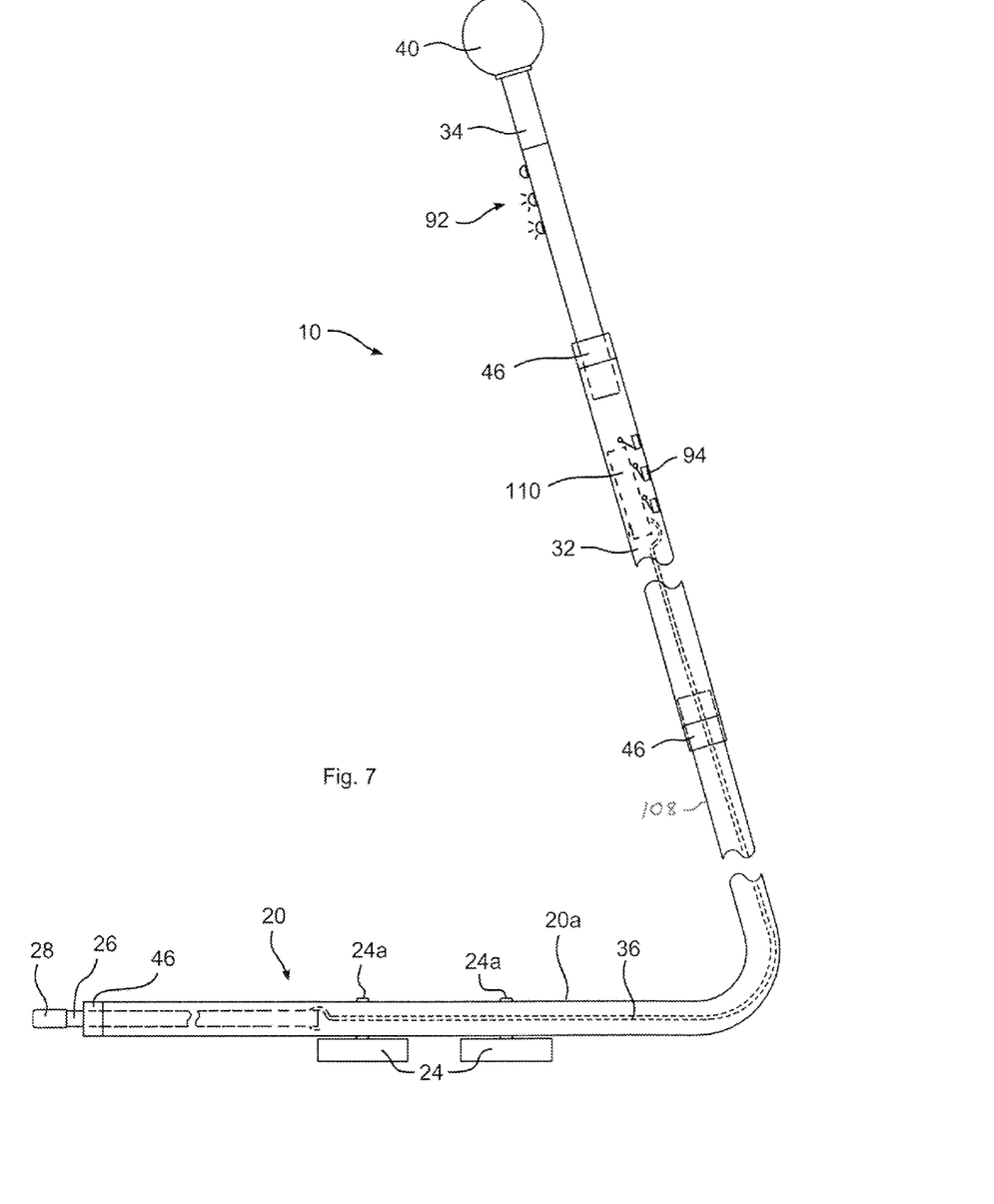
FIG. 7 illustrates an alternative illuminated embodiment in accordance with the invention.

With reference to FIG. 7, in yet another embodiment of the invention, flexible connector 36 is operative to move actuator 110 which engages at least one switch 94, operative to successively illuminate lights 92, in connection with wires and a power supply (not shown), as described with respect to FIG. 6, or as is otherwise known in the relevant art. Movement and use of calibration tube 32 operates substantially as described with respect to FIG. 1, however in this embodiment, switches 94 move in connection with calibration tube 32, and thus the point of engagement with actuator 110 changes, and thus device 10 may be calibrated as described above.

It should be understood that, in addition to lights or visible painted indicia, a recorded spoken message or audible alarm may be used to indicate approach to a hitching position, or the attainment of a hitching position. Actuation of the audible signal is achieved by actuation of switches in the embodiments of FIG. 6 or 7, or by actuation of a switch (not shown) connected to calibration rod 32, and actuated by movement of indicator rod 34, in the embodiment of FIG. 1.

Figure 8:
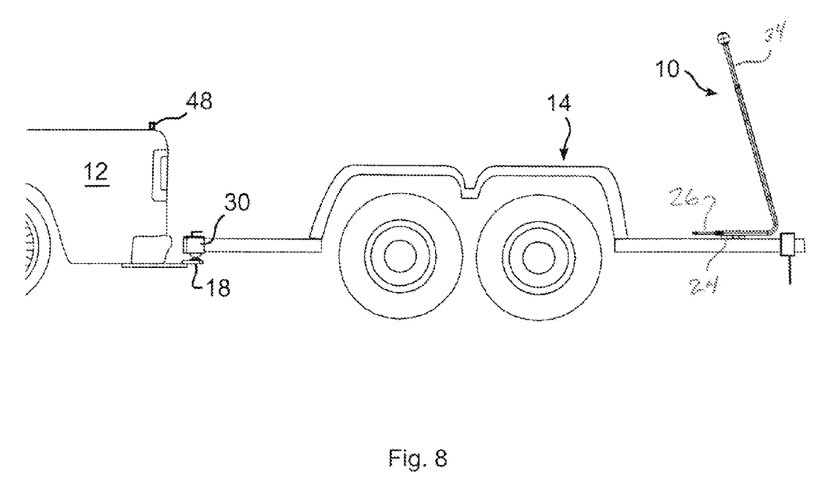
FIG. 8 illustrates an alternative location for mounting a hitch guide in accordance with the invention.

In accordance with a further embodiment of the invention, as shown in FIG. 8, one or more of device 10 may be placed away from the forward end of the trailer, or at the rearwards end of the trailer in particular, whereby lateral alignment is facilitated. This is particularly helpful where the trailer is low and cannot be viewed in either side mirror, or cannot be viewed in the rear view mirror. In this use, engagement rod 26 is advantageously pushed inwardly until the indicator rod 34 indicates a stop position, for maximum visibility of the device. During backing, as the trailer veers to the left or right, the indicator rod may be observed relative to a fixed point on the vehicle, such as marker 48. Since the rearward vehicle is farther from the marker, small changes in lateral alignment will appear more pronounced.

In addition, when backing the trailer into a close ended area, such as a garage, or against a building or other obstruction, it is easier to observe the distance between the rear of the trailer and the obstruction. If only one device 10 is available, it may be removed and attached at the back of the trailer for backing, as illustrated in FIG. 8. In accordance with the invention, this is facilitated if the attachment means is by magnets 24.

If there is only one device 10 available, it may be advantageous to move it to the rear of the trailer after hitching is complete, when it is desired to drive or back up the connected vehicles. If multiple devices are available, one could be used for hitching, and one or more additional devices for lateral alignment at the rear of the trailer. Device 10 may also be left in place during driving, for convenience, or for further alerting following drivers to the presence of the trailer, and in particular, a low trailer.

Figure 9:
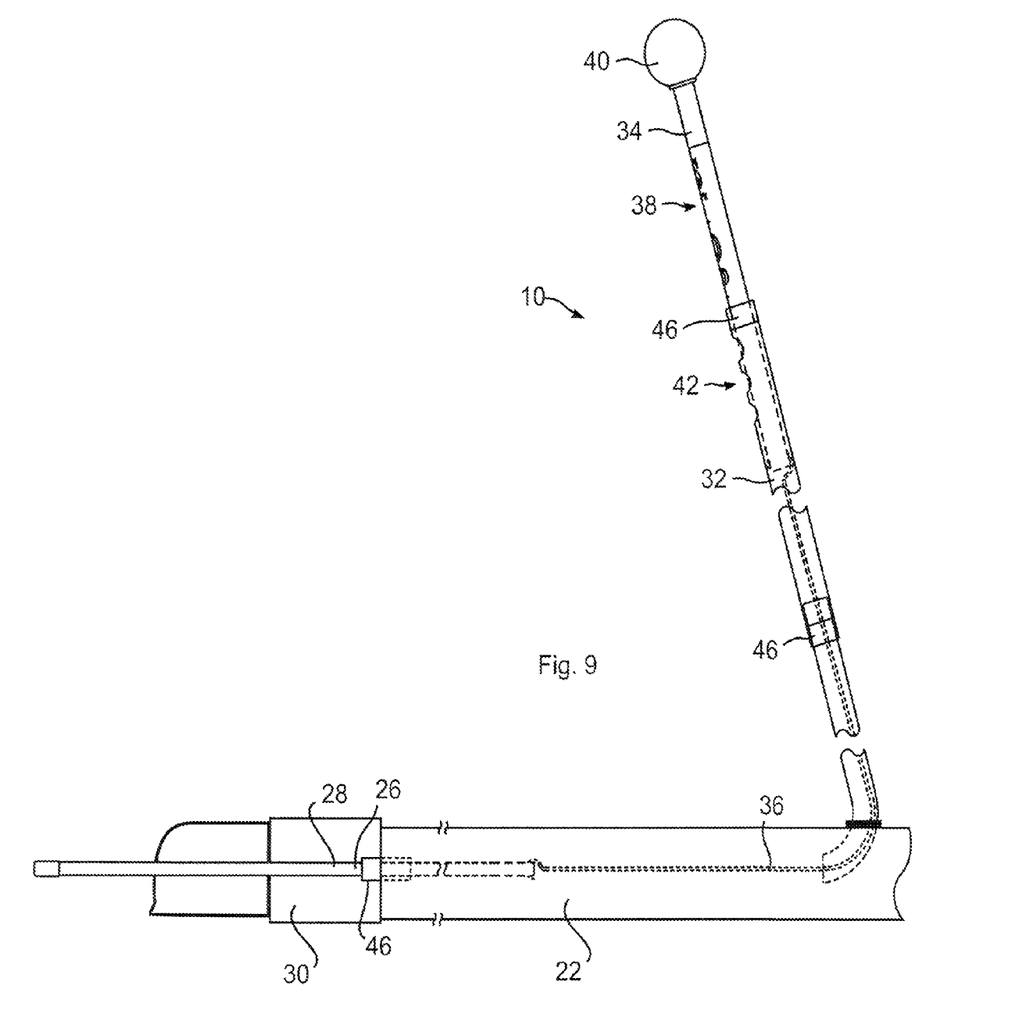
FIG. 9 illustrates yet another alternative location for mounting a hitch guide in accordance with the invention.

With reference to FIG. 9, in another embodiment in accordance with the invention, device 10 is integrated into the trailer structure, such as within the trailer draw bar 22. Main body 20 may be replaced in whole or in part by draw bar 22. Collar 46, in FIG. 9, maintains alignment and smooth movement of engagement rod 28 within draw bar 22, and alongside coupler 30 after emerging from draw bar 22 or trailer 14 body. This embodiment provides durability and protection for device 10, and may be incorporated into new trailer construction as a convenience and incentive for trailer purchasers, or may be retrofitted to existing trailers.

In accordance with a further embodiment of the invention, main body 20 may be hinged to reduce the overall size of device 10, to facilitate stowage.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed:

1. An apparatus for facilitating hitching a trailer to a vehicle, comprising:
    a body attachable to the trailer proximate a hitch of the trailer, having an elongated main channel defining
        a first length attachable to the trailer and containing a first end; and
        a second length disposed at an angle to said first length, extending upwards with respect to a longitudinal axis of the trailer, containing a second end;
    an elongated calibration channel operative to slideably engage said main channel between a first position wherein a portion of said calibration channel and main channel overlaps, and a second position wherein a relatively greater portion of said calibration channel and main channel overlaps;
    an elongated contact extension operative to contact the vehicle during use, movable by the vehicle to slide within said body in connection with said first end;
    at least one visible indicator associated with said body or said calibration channel, viewable by an operator of the vehicle, to indicate a hitching position of the vehicle and trailer that is substantially correctly aligned for hitching;
    means to communicate a change in position of said contact extension to said at least one visible indicator, whereby said at least one visible indicator will indicate the hitching position when said contact extension is slid a predetermined amount within said body;
    wherein said calibration channel is operative to set the predetermined amount that said contact extension is slid within said body before the hitching position is indicated.

2. The apparatus of claim 1, further comprising:
    at least one magnet connected to said body, operative to attach said apparatus to a trailer.

3. The apparatus of claim 1, wherein said body and calibration channel are tubes.

4. The apparatus of claim 1, further comprising:
    an elongated indicating extension supporting said at least one visible indicator, operative to slide within said second end of said body;
    a flexible member extending between said indicating extension and said contact extension;
    wherein when said contact extension is moved by said vehicle, said indicating extension slides within said body.

5. The apparatus of claim 4, wherein said flexible member is a rod.

6. The apparatus of claim 4, wherein said calibration channel and said second end of said main channel overlap, and said calibration channel is slideable to cover a portion of said at least one visible indicator supported upon said indicating extension;
    whereby the apparatus is calibrated before a first use by
        aligning said trailer and vehicle to a hitching position,
        engaging said contact extension with said vehicle,
        sliding said calibration channel to uncover a portion of said visible indicator which indicates a hitching position;
    wherein after calibration said contact extension is slid to extend from said body to cause a portion of said at least one visible indicator to be covered by said calibration channel, and thereby said at least one visible indicator no longer indicates a hitching position; and
    wherein said contact extension is thereafter pushable by the calibrated vehicle until a hitching position is again indicated, at which time a hitching position is achieved.

7. The apparatus of claim 6, wherein said calibration channel overlaps said second end and said indicating extension, and is frictionally maintained in a set position.

8. The apparatus of claim 6, wherein said calibration channel has at least one aperture, through which a portion of the indicator extension may appear during hitching.

9. The apparatus of claim 6, wherein said indicator extension bears written indicia which, when uncovered by said calibration channel, indicate a stop position.

10. The apparatus of claim 6, wherein said indicator extensions bears at least one contrasting colored region which, when uncovered by said calibration channel, indicates a position relative to a hitching position.

11. The apparatus of claim 1, wherein the body is fabricated from a material selected from the group consisting of: polyvinyl chloride, wood, metal, plastic.

12. The apparatus of claim 1, wherein the apparatus is sufficiently buoyant to float upon the surface of water.

13. The apparatus of claim 1, wherein said visible indicator is at least one electric light selected from the group consisting of: light emitting diode, incandescent light.

14. The apparatus of claim 13, wherein said contact extension is operative to cause at least one electrical connection, thereby operating said at least one electric light.

15. The apparatus of claim 14, wherein said calibration tube overlaps with one of said first end or said second end of said body, and said calibration tube is slideable to change a position at which said contact extension causes at least one electrical connection.

16. The apparatus of claim 14, wherein said calibration tube and said second end of said body overlap, and further comprising
   a flexible member having a first and second end, extending from said contact extension at said first end;
   an actuator connected to said second end of said flexible member;
   at least one electrical contact operative to form said at least one electrical connection, operable through engageable with said actuator.

17. The apparatus of claim 1, wherein a part of said apparatus is disposed within a part of the trailer.

18. The apparatus of claim 1, wherein said apparatus is connected to the trailer at a point distal to the trailer hitch, operative to aid in lateral alignment of the trailer during backing of a hitched trailer.

* * * * *